United States Patent [19]
Davis

[11] 3,826,563
[45] July 30, 1974

[54] SIDE VIEW MIRROR ATTACHMENT FOR MOTOR VEHICLE

[76] Inventor: Bernard E. Davis, 553 N. Harwood St., Orange, Calif. 92667

[22] Filed: Dec. 11, 1972

[21] Appl. No.: 314,176

Related U.S. Application Data

[63] Continuation-in-part of Ser. No. 238,065, March 27, 1972, abandoned.

[52] U.S. Cl. .............................. 350/303, 350/304
[51] Int. Cl. ........................................... G02b 5/08
[58] Field of Search .......................... 350/303, 304

[56] References Cited
UNITED STATES PATENTS

| | | | |
|---|---|---|---|
| 2,916,967 | 12/1959 | Hasuk | 350/304 |
| 3,180,219 | 4/1965 | Ruiz et al | 350/304 |
| 3,712,715 | 1/1973 | Wagner | 350/304 |

FOREIGN PATENTS OR APPLICATIONS

| | | | |
|---|---|---|---|
| 895,855 | 5/1962 | Great Britain | 350/303 |

Primary Examiner—Ronald L. Wibert
Assistant Examiner—Michael J. Tokar
Attorney, Agent, or Firm—Jessup & Beecher

[57] ABSTRACT

A mirror assembly is provided for attachment to a motor vehicle, and which is intended to be mounted on the vehicle as a "side view" mirror. The mirror assembly of the invention, in the embodiments to be described, comprises an upper flat mirror and a lower flat mirror, both of which are mounted in the same casing. The first and second mirrors are supported in essentially vertical planes, and they are inclined to one another so that when the assembly is attached to the motor vehicle, the two mirrors provide separate reflected fields, for increased coverage by the assembly, as compared with the usual prior art side view mirror. The casing of the assembly may be pivotally mounted on the motor vehicle, in the same manner as the usual side view mirror, for adjustment to a desired position.

2 Claims, 7 Drawing Figures

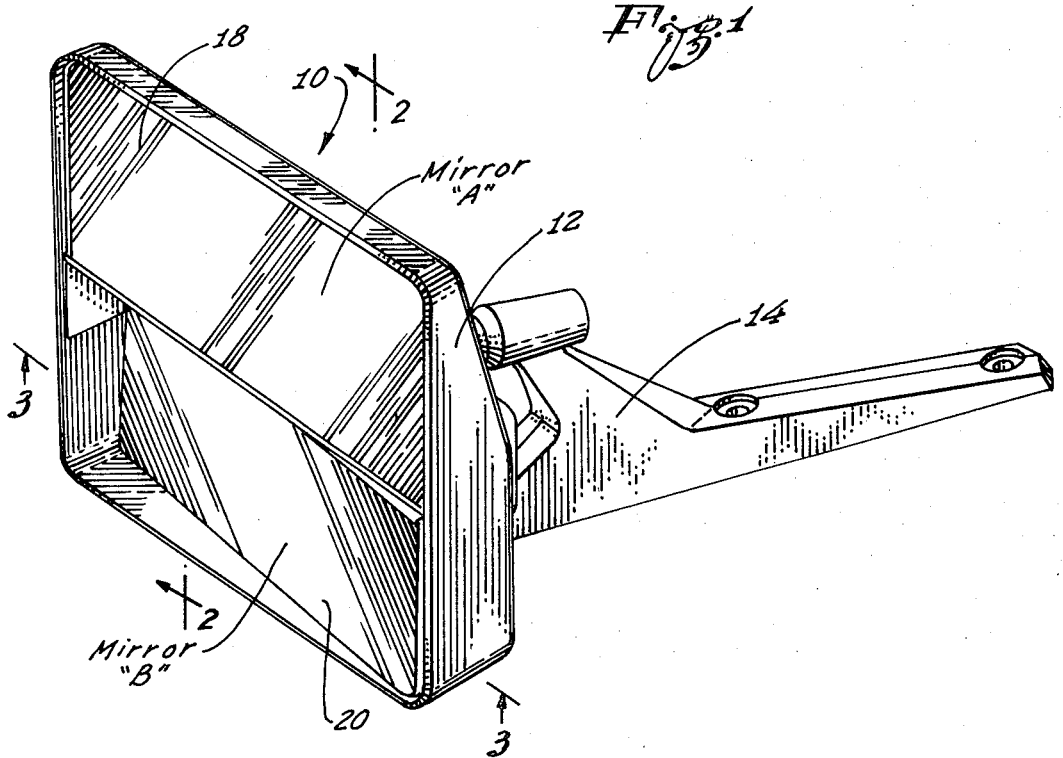
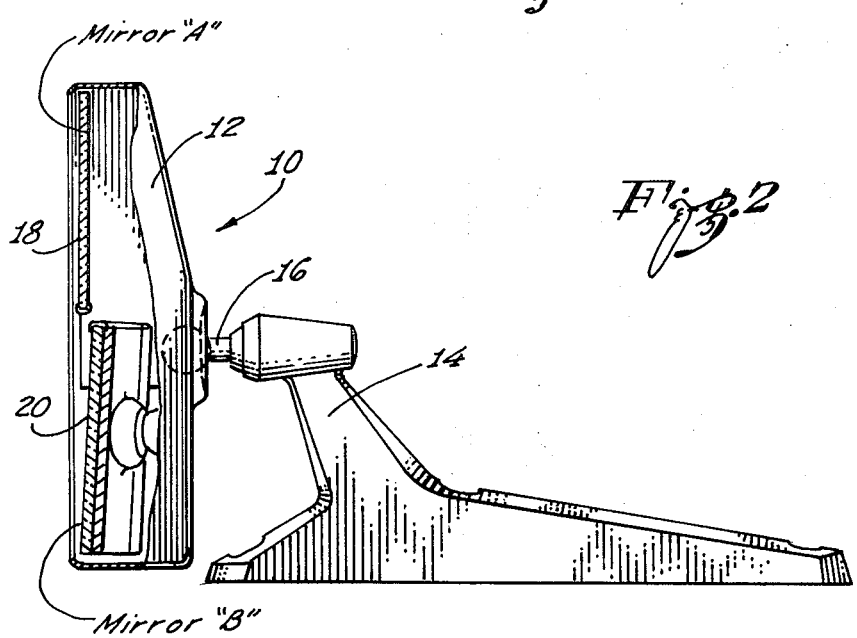

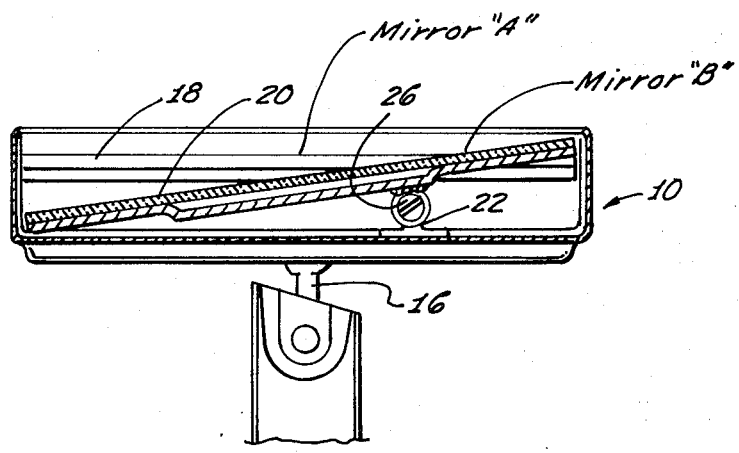
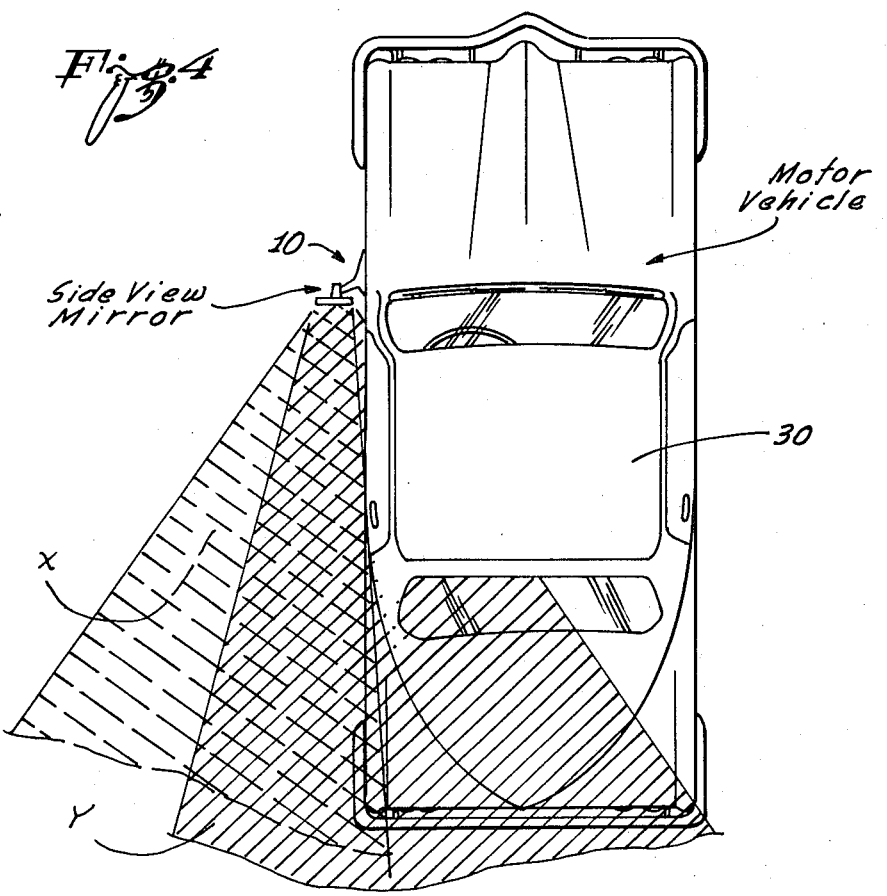

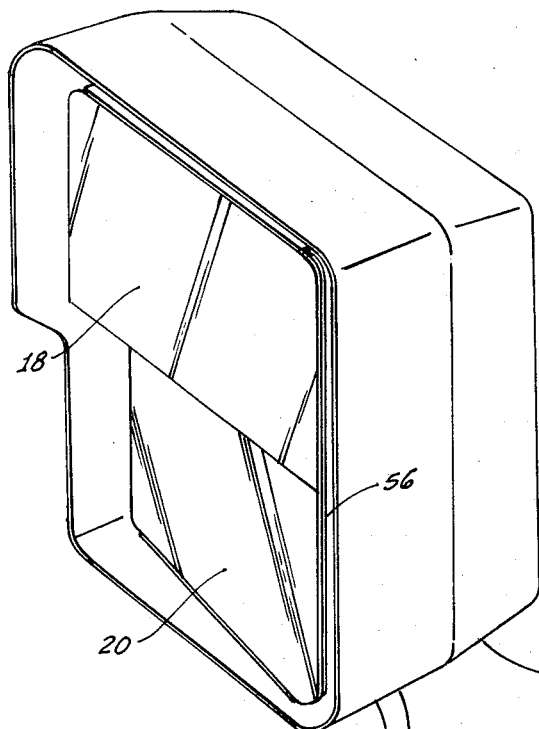
Fig. 5
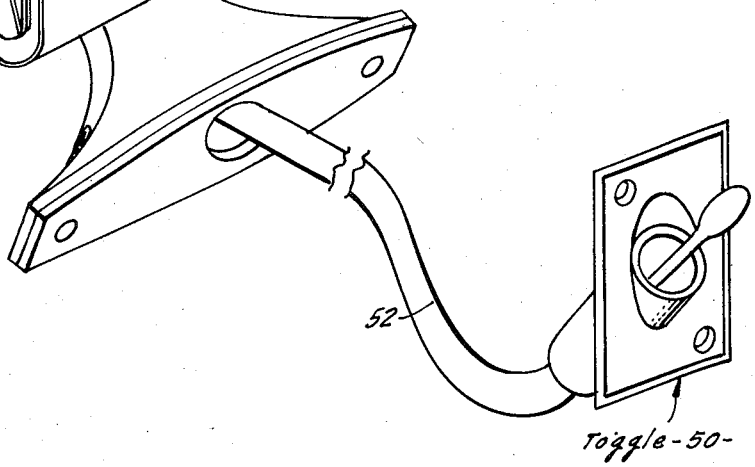
Toggle-50-
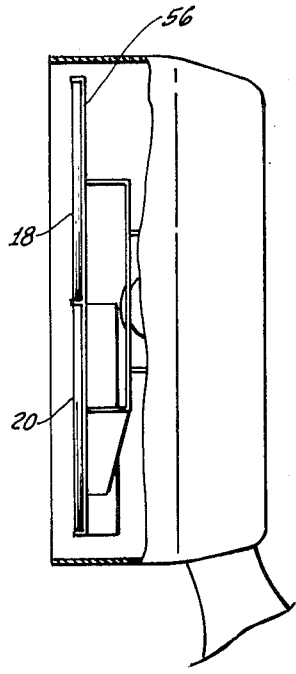
Fig. 6
Fig. 7

SIDE VIEW MIRROR ATTACHMENT FOR MOTOR VEHICLE

This application is a continuation-in-part of copending application Ser. No. 238,065 filed Mar. 27, 1972, and now abandoned.

BACKGROUND OF THE INVENTION

The usual prior art side view mirror which is presently in widespread use on motor vehicles suffers from a disadvantage in that it is possible for approaching vehicles to be lost in a dead spot in the reflective field of the mirror.

Because of the aforesaid deficiency in the usual single element prior art side view mirror, the motorist is never sure, after a glance in the side view mirror, whether or not there is a vehicle alongside of him, and whether or not it is safe for him to turn out. This situation forces the driver to take his eyes off the road in front of him, and to twist his head to assure himself that all is clear. Thus, additional hazards are created by the usual prior art side view mirror, since the driver is distracted.

The mirror assembly of the present invention, as described briefly above, utilizes two flat mirrors mounted in a single casing, and both disposed in essentially vertical planes and angularly displaced with respect to one another. The resulting mirror assembly provides an undistorted rear view along the side of the vehicle on which the mirror is mounted, and the assembly has an extended reflective field as compared with the prior art single element devices.

The mirror assembly of the invention is also advantageous over the prior art multi-mirror assemblies, in that one of the mirrors in such prior art assemblies is invariably curved, usually in a spherical convex configuration, and the curved part of the mirror provides a distorted view of the reflected field, and this can be most confusing to the average driver.

BRIEF DESCRIPTION OF THE DRAWINGS

FIG. 1 is a perspective representation of a mirror constructed in accordance with the teachings and concepts of the invention;

FIG. 2 is a side section of the assembly of FIG. 1, taken essentially along the line 2—2 of FIG. 1;

FIG. 3 is a bottom section taken along the line 3—3;

FIG. 4 is a top plan view, showing the mirror assembly of the invention mounted on a motor vehicle, and also illustrating the reflective field of the assembly;

FIG. 5 is a perspective representation of a second embodiment of the invention;

FIG. 6 is a side view of the assembly of FIG. 5, partly broken away to reveal the internal components of the assembly; and FIG. 7 is a perspective representation of a bracket member which is incorporated into the assembly of FIGS. 5 and 6.

DETAILED DESCRIPTION OF THE ILLUSTRATED EMBODIMENTS

The mirror assembly illustrated in the FIGS. 1–3 drawing is designated generally as 10. The mirror assembly 10 includes a casing 12 which is pivotally coupled to a mounting bracket 14 through a universal ball joint assembly 16. The casing 12 supports a first mirror element 18 which is designated mirror "A." When the assembly is mounted on a vehicle, the mirror 18 is supported in a generally vertical plane.

The assembly of FIG. 1 also includes a second mirror element 20, designated mirror "B." The mirror 20 is also supported in a generally vertical plane when the assembly is attached to the motor vehicle, or it may be tilted slightly from the vertical in an upward direction, as shown. In the representation of FIG. 3, it will be seen that the mirror 20 is pivotally mounted on a ball joint 22, to be rotatable to any desired angular orientation. The ball joint 22 permist universal angular adjustment of the mirror 20. The axis of rotation of the mirror 20 is displaced laterally from the center of the mirror, so that it may be inclined, and still be retained essentially within the confines of the casing 12. In this way, the right-hand end of the mirror 20 in FIG. 2 will not protrude excessively from the front of the casing when it is turned to an inclined position. The mirror 20 may be turned to any desired angle with respect to the mirror 18, and tightened and held in the selected angular position by means of a screw 26. The ball joint 16 and the ball joint 22 permit universal angular adjustment of the mirror 20.

As shown in FIG. 4, when the side view mirror 10 is mounted on a motor vehicle 30 the two mirror elements have respective reflective fields, such as a reflective field X and a reflective field Y. The two reflective fields intersect, as shown in FIG. 4. However, it will be observed that the overall reflective field is increased, with the reflective field X extending laterally away from the vehicle, and with the reflective field Y covering the area adjacent the vehicle. Therefore, by use of the mirror assembly of the present invention, any vehicle approaching the motor vehicle 30, either closely adjacent the left-hand side of the vehicle, or displaced out from the vehicle, will be detected, so that the dangerous dead spots which are prevalent in present day side view mirrors are obviated.

It will be appreciated that a similar assembly may be mounted on the right-hand side of the vehicle, since blind spots also occur on that side. In the latter assembly, the ball joint 16 and ball joint 22 would be placed on the left-hand side of the mirror 20 to permit full angular adjustment of the mirror without impairing the appearance of the assembly.

The mirror assembly of the present invention provides two undistorted reflective views of the area to the read of the side of the vehicle. One reflective view covers the region adjacent the side of the vehicle, and the other reflective view covers the area displaced out from the side of the vehicle. Both reflective views are undistorted.

Although the mirrors 18 and 20 have been described as being mounted one below the other, they could be mounted adjacent one another, again with one fixed and the other adjustable, as described.

The embodiment of FIG. 5 is generally similar to that of FIGS. 1, 2 and 3, and like components have been designated by the same numbers. However, the embodiment of FIGS. 5 and 6 is one which may be controlled from the interior of the motor vehicle by means of a toggle 50 which is coupled to the mirror assembly through an appropriate cable 52. This toggle control of an external rear view mirror is, in itself, well known.

In the practice of the present invention, however, the mirrors 18 and 20 described above are mounted in a bracket 56. The bracket 56 is supported within the mirror assembly to be controlled by the toggle 50, so as to be moved in all directions, as the toggle is adjusted. The bracket 56 supports the two mirrors 18 and 20 in a predetermined angular relationship with respect to one another.

For example, the bracket 56 supports the two mirrors so that they define with respect to one another a predetermined horizontal angle within a range, substantially extending from 5° to 12°, and at a vertical angle within a range extending substantially from 2° to 4°. In this way, even though the mirrors 18 and 20 are freely adjustable in unison by the toggle 50, their relationship with respect to one another is fixed at the factory by the formation of the bracket 56. For example, it has been found that a vertical angle of 3° and a horizontal angle of 9° produces optimum results, insofar as the desired reflective fields of the two mirrors are concerned.

While particular embodiments of the invention have been shown and described, modifications may be made. It is intended in the following claims to cover all modifications which come within the spirit and scope of the invention.

What is claimed is:

1. A side view mirror assembly for mounting on the side of a motor vehicle to provide a reflected view of the area to the rear of the vehicle, said assembly including: a casing including mounting means for attaching the casing to a motor vehicle; a bracket defining first and second fixed flat planar sections disposed at a predetermined inclination to one another, said bracket being pivotally mounted in said casing for angular movement with respect thereto in all directions; a first flat mirror member mounted on said first flat planar section of said bracket and extending thereacross to be supported in a first substantially vertical plane thereby; and a second flat mirror member mounted on said second flat planar section of said bracket and extending thereacross to be supported in a predetermined fixed angular relationship with respect to said first mirror member and in a second substantially vertical plane thereby angularly displaced from said first vertical plane, said bracket supporting said first flat mirror member and said second flat mirror member at a predetermined vertical angle with respect to one another in a range extending substantially from 2° to 4°, and at a predetermined horizontal angle with respect to one another in a range extending from 5° to 12°.

2. The mirror assembly defined in claim 1, in which the predetermined vertical angle between the first and second flat mirror members is substantially 3°, and the predetermined horizontal angle between the first and second flat mirror members is substantially 9°.

* * * * *